United States Patent [19]

Thiele

[11] Patent Number: 4,960,915

[45] Date of Patent: Oct. 2, 1990

[54] PROCESS FOR THE PRODUCTION OF LINEAR POLYESTERS, PARTICULARLY FOR FILMS AND FOILS

[75] Inventor: Ulrich Thiele, Bruchkoebel, Fed. Rep. of Germany

[73] Assignee: Davy McKee, AG, Frankfurt, Fed. Rep. of Germany

[21] Appl. No.: 313,905

[22] Filed: Feb. 23, 1989

[30] Foreign Application Priority Data

Apr. 26, 1988 [DE] Fed. Rep. of Germany ....... 3814022

[51] Int. Cl.$^5$ .................... C08K 3/34; C08L 67/02
[52] U.S. Cl. ................... 524/706; 524/709; 524/789; 524/878
[58] Field of Search .............. 524/706, 709, 789, 878, 524/447; 528/282

[56] References Cited

U.S. PATENT DOCUMENTS

| | | | |
|---|---|---|---|
| 3,366,597 | 1/1968 | Fort | 524/447 |
| 3,376,249 | 4/1968 | Meelheim | 524/878 |
| 3,419,460 | 12/1968 | Ure | 524/447 |
| 4,654,249 | 3/1987 | Barbey et al. | 428/148 |

*Primary Examiner*—Lewis T. Jacobs
*Attorney, Agent, or Firm*—Allegretti & Witcoff, Ltd.

[57] ABSTRACT

A process for the production of linear polyesters, the acid component consisting essentially of terephthalate units and the glycol component of ethylene glycol, by transesterification or direct esterification in the presence of an aluminum silicate-ethylene glycol suspension followed by polycondensation. An acidic phosphorus compound and subsequently an alkaline compound are added to the aluminum silicate before or during the formation of the suspension.

8 Claims, No Drawings

PROCESS FOR THE PRODUCTION OF LINEAR POLYESTERS, PARTICULARLY FOR FILMS AND FOILS

BACKGROUND OF THE INVENTION

The invention relates to a process for the production of linear polyesters or copolyesters in which an aluminum silicate-ethylene glycol suspension is added to the reaction mixture. The invention relates in particular to a process for making polyesters with low diethylene glycol content for films and foils.

THE PRIOR ART

Polyesters for films and foils are usually produced by adding finely distributed inert particles to the reaction mixture or by forming the particles in the reaction mixture through precipitation. The inert particles are necessary for good wind-up and sliding properties as well as for a smooth and even surface. As an additive, among other substances, kaolin, preferably with a particle diameter of not more than 1 μm is used (U.S. Pat. No. 4,654,249).

However, natural aluminum silicates such as kaolin contain foreign metal atoms which interfere with the desired inert behavior of the particles during the production of the polyester. Thus, the addition of natural aluminum silicates during the synthesis of a polyester of which the glycol component is ethylene glycol results, depending on the process conditions, in a more or less pronounced formation of diethylene glycol (DEG). Because of its influence on the polyester properties, the presence of DEG is undesirable. For high quality films, the DEG content should generally not exceed approximately 1.5% by weight. A particularly intensive DEG formation occurs if, during the direct esterification of, for example, terephthalic acid with ethylene glycol, the aluminum silicate suspension is admixed to the monomer paste; or if, during the discontinuous transesterification of, for example, dimethylterephthalate with ethylene glycol, due to a process interruption the residence time of the aluminum silicate-containing reaction mixture is prolonged.

THE INVENTION

The object of this invention is to modify the above-stated process for the production of linear polyesters so that the desired inert behavior of the aluminum silicate particles is ensured, independently of the residence time in the reaction mixture. Another object is to produce a polyester which has a lower DEG content than a polyester obtained by a process of the prior art.

In accordance with the invention, these objects are achieved by adding an acidic phosphorus compound to the aluminum silicate before or during the suspension of the silicate in ethylene glycol, in such an amount that the ratio of the foreign metal atoms contained in the aluminum silicate to the phosphorus atoms is in the range of 0.1 to 5. Subsequently the pH value of said suspension is adjusted to a value in the range of 6.1 to 9.0, measured with a glass electrode, by addition of an alkaline compound. Finally this suspension is added to the polyester-forming reaction mixture, the addition taking place not later than the beginning of the polycondensation.

It has surprisingly been found that a significant reduction of the DEG content takes place only if the phosphorus compound is first added, followed by the alkaline compound. Any other sequence has proven to be ineffective. It is without significance, however, whether the phosphorus compound is added during the suspending of the aluminum silicate in the ethylene glycol, or earlier during a preceding processing stage in aqueous or dry phase.

As producers of polyesters generally do not process the aluminum silicates themselves, the addition of the phosphorus compound and of the alkaline compound while suspending the silicate in ethylene glycol is preferred.

Phosphorus compounds, suitable for use in the invention, include phosphoric acid, phosphorus acid, soluble acidic salts or acidic esters thereof and phosphonic acids. Phosphoric and phosphorus acids are preferred. In order to determine the quantity of phosphorus compounds to be added, it is necessary first to analyze the total content of foreign metal atoms in the aluminum silicate such as iron, manganese, chromium, zinc, cobalt, nickel and copper, for example by means of atom absorption spectroscopy. Commercially available kaolins used for polyester films usually have a foreign metal content in the range of 0.3 weight percent, from which over 90% are iron. Titanium which is present only as titanium dioxide has proven to be inert in the process in accordance with the invention, and therefore has not to be considered hereby. The atomic ratio of foreign metal to phosphorus should lie between 0.1 and 5, preferably between 0.5 and 1.5.

After the addition of the phosphorus compound, the aluminum silicate reacts slightly acidic. In order to attain the desired inert behavior of the particles in accordance with the invention, it is necessary to add subsequently enough of an alkaline compound to adjust the pH value of the aluminum silicate-ethylene glycol suspension to a pH value in the range of 6.1 to 9.0. Suitable alkaline compounds are the hydroxides of sodium, potassium, lithium, magnesium, strontium or calcium; also amines, such as triethanolamine, triisopropylamine or tetraethylammonium hydroxide. As due to the large surface of the fine aluminum silicate particles, the pH adjustment is time dependent, the alkali addition has to be continued until the pH value, measured with a glass electrode, remains constant. If the treatment of the aluminum silicate takes place during a preceding processing stage, then the alkali quantity must be determined by means of preliminary experiments.

In the case of the preferred treatment of the aluminum silicate suspended in the ethylene glycol, it has proven advantageous to use both the phosphorus compound as well as the alkaline compound dissolved in ethylene glycol.

To achieve a distribution of the particles in the polyester as homogeneous as possible, the aluminum silicate-ethylene glycol suspension after the treatment according to the invention should be added to the reaction mixture during a relatively low viscous phase of the polyester production process. As an inert behavior of the aluminum silicate is attained in accordance with the invention, the silicate suspension can be added without disadvantage to the monomer paste, but also at any time before or at the beginning of the polycondensation. A later addition is also possible, but less suitable. The quantity of aluminum silicate to be added lies, depending on the use of the polyester, in the usual range from 0.01 to 10.0 weight % relative to the polyester, preferably from 0.1 to 1.0%.

The process in accordance with the invention can be carried out continuously as well as discontinuously, and is suited for all linear polyesters, the acid component of which consists essentially of terephthalate units and the glycol component of ethylene glycol, as well as for any aluminum silicates of natural origin. The preferred application are kaolin-containing polyethylene terephthalates for films and foils.

SPECIFIC EXAMPLES

The invention will be described in further detail in the following examples, but without restriction to these. The Kaolin-R used in the examples is produced by Amberger Kaolin-Werke GmbH, P.O. Box 1140, D-8452 Hirschau, Federal Republic of Germany, and contains, according to our own atom absorption spectroscopy measurements, 2616 ppm Fe, 4 ppm Ni, 4 ppm Co, 8 ppm Cu, and 89 ppm Cr.

COMPARATIVE EXAMPLE 1

(A) 1000 g of Kaolin-R were dispersed in 4000 g ethylene glycol by means of a tooth disk agitator (dissolver) and subsequently milled in a perl mill (Suspension A).

(B) Dimethylterephthalate was reacted with ethylene glycol in the molar ratio of 1:2.2 in the presence as transesterification catalyst of 80 ppm Mn as manganese diacetate, and as stabilizer of 50 ppm P as trimethylphosphate at a slowly rising temperature. At 225° C., the degree of conversion was 98%.

At this time, 25 g of Suspension A were added to 1000 g of this reaction product and the mixture polycondensed in the presence of 280 ppm Sb as antimony trioxide for 3 h, at a temperature of 279° C. and at a pressure of 0.6 mbar.

The resulting polyethylene therephthalate had a DEG content of 1.3 weight % relative to polyester, the determination being carried out by gas chromatography after methanolysis.

COMPARATIVE EXAMPLE 2

The process was carried out in the same way as in Comparative Example 1, but with the difference that after adding Suspension A and before polycondensation, the mixture remained for 1 h at 230° C. and at atmospheric pressure.

The DEG content of the polyester obtained was 2.8 weight %.

COMPARATIVE EXAMPLE 3

140 kg of a paste of terephthalic acid and ethylene glycol in the molar ratio of 1:1.2 were added at a temperature of 270° C. over a period of 160 min. under atmospheric pressure to 12.5 kg of an esterification product of terephthalic acid and ethylene glycol with a degree of conversion of 98.5%. The paste contained 0.5% kaolin (relative to the final polyester) in the form of Suspension A of Comparative Example 1.

After an additional residence time of 10 min., 300 ppm Sb are added as antimony trioxide, and the mixture polycondensed for 160 min. at 279° C. and 0.6 mbar.

The DEG content of the polyester was 3.1 weight %.

COMPARATIVE EXAMPLE 4

The process was carried out as in Comparative Example 3. However, the addition of the kaolin Suspension A took place after the esterification reaction, directly before the polycondensation.

The DEG content of the polyester amounts to 1.7 weight %.

EXAMPLE 1

(A) 1000 g of Kaolin R were dispersed with 4000 g ethylene glycol by means of the dissolver and subsequently milled in a perl mill. After the first passage through the mill, the pH value of the suspension was 4.6. 5 g of phosphoric acid (concentration 80%) in 100 g of ethylene glycol, corresponding to an atomic ratio of foreign metal to phosphorus of 1.2, was added to this suspension. The pH value of the acidified suspension after the second passage through the mill was 4.1. Under slight agitation, a sufficient quantity of a 5% KOH-ethylene glycol solution was added to the suspension to adjust the pH value to 7.5.

After one hour under slight agitation, the pH value of the suspension has dropped to 6.1. Again an adjustment to a pH value of 8.0 is carried out with glycolic KOH.

(B) The kaolin-ethylene glycol suspension thus produced was added to the polyester process as described in Comparative Examples 1 to 4.

The DEG contents of the polyesters obtained are set forth in the table below.

EXAMPLE 2

(A) 1000 g of Kaolin R were dispersed in 4000 g ethylene glycol by means of the dissolver and subsequently milled in a perl mill.

After the first passage through the mill, the pH value was 4.5.

The suspension was adjusted to a pH of 7.9 by adding a 5% LiOH-ethylene glycol solution and then finished to mill. After milling, the pH value was readjusted over the course of one hour by renewed addition of LiOH so that the pH of the final suspension was 7.9.

(B) The kaolin-ethylene glycol suspension thus produced was added to the polyester process as described in Comparative Examples 1 to 4.

The DEG contents of the polyesters obtained are set forth in the table below.

EXAMPLE 3

(A) A kaolin-ethylene glycol suspension was produced in the same manner as described in Example 1(A), except, instead of phosphoric acid, phosphorus acid was used in the same quantity, corresponding to an atomic ratio of foreign metal to phosphorus of 1.0. Further, the pH was not adjusted. The final suspension had a pH value of 4.1.

(B) Without addition of alkali, this suspension was added to the polyester process as described in Comparative Examples 1 to 4.

The DEG contents of the polyesters obtained are set forth in the table below.

EXAMPLE 4

(A) A kaolin-ethylene glycol suspension was produced as described in Example 1(A). The adjustment of the pH to 7.5, after the addition of the phosphoric acid, was made by adding a 5% solution of triisopropylamine in ethylene glycol.

(B) The kaolin-ethylene glycol suspension thus produced was added to the polyester process as described in Comparative Examples 1 to 4.

The DEG contents of the polyesters are set forth in the table below.

TABLE

DEG content, in weight %, of the polyesters obtained.

| Comparative Examples Number | % DEG | Example No. 1 % DEG | 2 | 3 | 4 |
|---|---|---|---|---|---|
| 1 | 1.3 | 0.6 | 0.9 | 0.8 | 0.7 |
| 2 | 2.8 | 1.3 | 1.9 | 1.8 | 1.2 |
| 3 | 3.1 | 1.0 | 1.5 | 1.6 | 0.9 |
| 4 | 1.7 | 1.0 | 1.3 | 1.4 | 1.0 |

Examples 1 to 4 correspond to the process in accordance with the invention, whereas Examples 2 and 3 describe the effectiveness of one partial step. As is clearly evident from the table, the favourable results in accordance with the invention can only be attained by combination of both partial steps.

What is claimed is:

1. In a process for producing linear polyesters containing fine particles of an aluminum silicate by reaction of ethylene glycol with a compound selected from aromatic dicarboxylic acids and alkyl esters thereof, the compound consisting essentially of a terephthalic compound, and polycondensation of the reaction mixture, the improvement comprising:
   (a) suspending fine particles of an aluminum silicate containing foreign metal atoms in ethylene glycol,
   (b) adding to the aluminum silicate suspension an acidic phosphorus compound selected from the group consisting of phosphoric acid, phosphorus acid, a soluble acidic salt and acidic ester thereof, a phosphonic acid and mixtures thereof, in such an amount that the atomic ratio of foreign metal atoms to phosphorus atoms is in the range of 0.1 to 5.0.
   (c) adjusting the pH of said suspension to a value in the range of 6.1 to 9.0, measured with a glass electrode, by addition of an alkaline compound selected from the group consisting of alkali hydroxides, alkaline earth hydroxides, triethanolamine, triisopropylamine, tetraethylammonium hydroxide and mixtures thereof, and
   (d) adding the suspension of step (c) to the reaction mixture, the addition taking place not later than the beginning of the polycondensation.

2. The process of claim 1 in which the acidic phosphorus compound of step (b) and thereafter the alkaline compound of step (c) are added to the aluminum silicate prior to step (a).

3. The process of claim 1 in which the suspension of step (c) is added to the reaction mixture before the beginning of the reaction.

4. The process of claim 1 in which the acidic phosphorus compound of step (b) and the alkaline compound of step (c) are added in form of ethylene glycol solutions.

5. The process of claim 1 in which the atomic ratio in step (b) is in the range of 0.5 to 1.5.

6. The process of claim 1 in which said aluminum silicate is kaolin.

7. The process of claim 1 in which said polyester is polyethylene terephthalate.

8. Polyethylene terephthalate made by the process specified in claim 1 and having a diethylene glycol content of not more than 1.5% by weight.

* * * * *